J. R. GLOVER.
Shovel-Plows.

No. 157,681.

Patented Dec. 15, 1874.

Witnesses:
Hepburn McClure
Samuel G. Morrison

Inventor:
James R. Glover

UNITED STATES PATENT OFFICE.

JAMES R. GLOVER, OF SALLADYBURG, PENNSYLVANIA.

IMPROVEMENT IN SHOVEL-PLOWS.

Specification forming part of Letters Patent No. 157,681, dated December 15, 1874; application filed September 7, 1874.

*To all whom it may concern:*

Be it known that I, JAMES R. GLOVER, of Salladyburg, Lycoming county, Pennsylvania, have invented a Shovel-Plow, of which the following is a specification:

The object of my invention is to secure upon the center or crown line of a convex shovel for a shovel-plow a cutter-blade the length of the crown-line of the shovel, and extending above the shovel about six inches, which excess of length is for compensation in wear, securely bolted upon the shovel for the purpose of cutting roots, &c.

I usually construct my shovel convexed, with a rib on each side of the crown line, wrought upon the shovel at such distance apart so as to receive the back of the cutter-blade, thus forming a groove at two or more points. In this groove there are holes to receive the bolts, which bolts have round heads, flattened on two sides to the thickness of the back of the cutter-blade. The back of the cutter-blade is perforated with round holes the size of the round head of the bolt, which perforations have slots cut into them from the back of the cutter-blade of sufficient width to receive the bolt, while the head enters the round hole. These perforations in the cutter-blade are made from the lower end of the heel of the cutter, beginning about six inches up, in corresponding sections to suit the several bolt-heads used, which arrangement is for the purpose of dropping the cutter-blade to accommodate the wear upon it, and keep its heel and point on a horizontal line with the point of the shovel. The bolts passing through the beam of the plow are secured by thread and burr to draw down the bolts carrying the cutter-blade, and holding it secure in its position between the two ribs.

Figure 1:
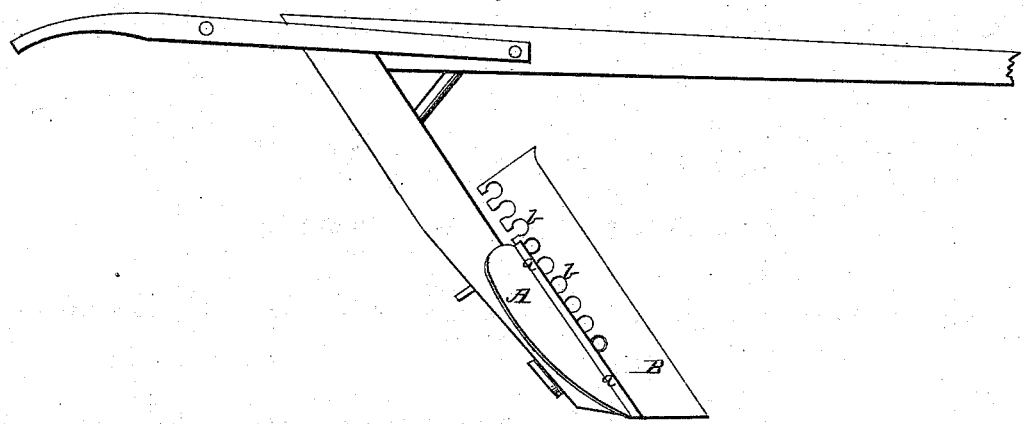
Figure 2:
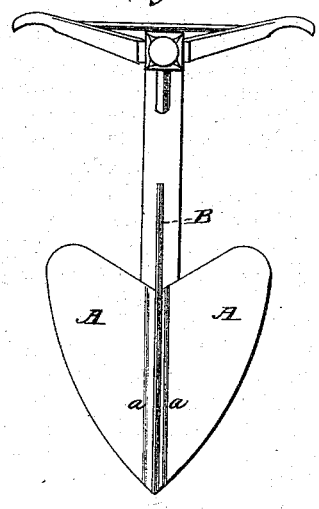

The plow is illustrated more in detail in the drawings by plan view, Figure 1.

The shovel, marked A, shows the two ribs, marked *a a*. The cutter-blade B shows the perforations or round holes, with a slot opening to the back corresponding to the flattened circular heads of the bolts, marked *b b*.

I claim—

The combination of the shovel A, having a vertical center groove and ribs, the adjustable cutter-blade B, having holes slotted to the rear edge, and the bolts C C, substantially as described, and for the purposes specified.

JAMES R. GLOVER.

Witnesses:
HEPBURN McCLURE,
SAMUEL G. MORRISON.